United States Patent
Pahl et al.

(10) Patent No.: US 6,980,104 B2
(45) Date of Patent: Dec. 27, 2005

(54) AIRCRAFT WITH SECURITY ALARM SYSTEM

(75) Inventors: Jeannette M. Pahl, Afton, MN (US); Douglas M Pahl, Afton, MN (US); Donald D. Waller, Wyoming, MN (US)

(73) Assignee: Capitol Electronics, Inc., St. Paul, MN (US)

( * ) Notice: Subject to any disclaimer, the term of this patent is extended or adjusted under 35 U.S.C. 154(b) by 84 days.

(21) Appl. No.: 10/494,427

(22) PCT Filed: Jan. 24, 2003

(86) PCT No.: PCT/US03/02344

§ 371 (c)(1),
(2), (4) Date: Apr. 22, 2004

(87) PCT Pub. No.: WO03/064252

PCT Pub. Date: Aug. 7, 2003

(65) Prior Publication Data

US 2004/0257246 A1      Dec. 23, 2004

Related U.S. Application Data

(60) Provisional application No. 60/437,231, filed on Dec. 30, 2002, provisional application No. 60/352,713, filed on Jan. 29, 2002.

(51) Int. Cl.[7] .......................... G08B 1/08; G08B 21/00; B64C 11/00
(52) U.S. Cl. ...................... 340/539.1; 340/945; 701/3; 701/9; 244/1 R; 244/118.5
(58) Field of Search .............................. 340/539.1, 945

(56) References Cited

U.S. PATENT DOCUMENTS

| | | | |
|---|---|---|---|
| 3,113,270 | A | 12/1963 | Bassett |
| 3,440,635 | A | 4/1969 | Hull |
| 3,704,845 | A | 12/1972 | Ord |
| 3,999,015 | A | 12/1976 | Snyder et al. |
| 4,048,621 | A | 9/1977 | Conklin et al. |
| 4,057,790 | A | 11/1977 | Fleming |
| 4,057,794 | A | 11/1977 | Grossfield |
| 4,157,540 | A | 6/1979 | Oros |
| 4,331,953 | A | 5/1982 | Blevins et al. |

(Continued)

OTHER PUBLICATIONS

Seaboard Electronics; "Seaboard Electronic Systems: PTX Personal Alarm System" specification sheet; Seaboard Electronics, Carlsbad, CA; unknown, Apr. 22, 2004.

*Primary Examiner*—Donnie L. Crosland
(74) *Attorney, Agent, or Firm*—Gray, Plant, Mooty, Mooty & Bennett, P.A.; Robert W. Gutenkauf (57) ABSTRACT

A passenger aircraft with a security alarm system includes an aircraft fuselage divided into a cockpit and a passenger cabin. One or more portable transmitter units carried by cabin crew members or other authorized personnel are adapted for discrete activation which sends a coded signal in the form of a radio frequency data burst to a receiver unit located at an intermediate location in the passenger cabin. The receiver unit activates and alarm unit through hard wiring past the bulkhead wall. The alarm unit includes one or more audio or visual alarm devices that alert the cockpit crew to an emergency situation in the cabin. The system includes a mute function that automatically mutes various alarms in the cockpit to prevent distraction of the cockpit crew. During the mute on condition, the alarm assembly stores any received signals until the mute on condition is ended.

30 Claims, 6 Drawing Sheets

U.S. PATENT DOCUMENTS

| | | |
|---|---|---|
| 4,764,953 A | 8/1988 | Chern et al. |
| 4,831,438 A | 5/1989 | Bellman, Jr. et al. |
| 4,879,542 A | 11/1989 | Elsey |
| 4,906,972 A | 3/1990 | Spencer |
| 5,223,818 A | 6/1993 | Polo |
| 5,410,739 A | 4/1995 | Hart |
| 5,428,388 A | 6/1995 | Von Bauer et al. |
| 5,933,098 A | 8/1999 | Haxton |
| 6,025,779 A | 2/2000 | Huang |
| 6,744,381 B1 * | 6/2004 | Collins ........................ 340/945 |
| 6,816,087 B2 * | 11/2004 | Lane .......................... 340/945 |
| 6,819,264 B2 * | 11/2004 | Bissett ........................ 340/945 |
| 2003/0062447 A1 * | 4/2003 | Cordina et al. .......... 244/118.5 |

* cited by examiner

AIRCRAFT WITH SECURITY ALARM SYSTEM

CROSS REFERENCE TO RELATED APPLICATION

This application claims the benefit of U.S. Provisional Patent Applications Ser. No. 60/352,713 filed Jan. 29, 2002, and Ser. No. 60/437,231 filed Dec. 30, 2002 and is a 371 of PCT/US03/02344, filed Jan. 24, 2003.

BACKGROUND OF THE INVENTION

A paramount issue with respect to air travel is that of aircraft cabin security. Of particular importance is isolation of the commercial aircraft passenger cabin from the forward cabin or cockpit. This is necessary in order to thwart unauthorized entry to the cockpit. Current and pending regulations require safety measures to restrict access to the cockpit such as providing a sturdy cockpit door that can be locked from the cockpit side. Yet of course it is necessary for the cockpit crew from time to time to have access to the passenger cabin. For this reason it is desirable to have an alarm system to immediately notify the cockpit crew of any threatening activity occurring in the passenger cabin. The cockpit crew can then take security measures as may be immediately necessary.

The first line of defense to a cockpit intrusion or other cabin disturbance is the cabin attendant. The cabin attendants deal with the minor disturbances but are required to alert the cockpit crew to the more major problems. Hard wired telephone style intercom sets installed in the aircraft are connected between the cabin and the cockpit for communication. At times the need for communication with the crew is urgent such that there is little time to go to an intercom station to call the cockpit. Also, use of the intercom does not per se alert the cockpit crew to the urgency of the incoming message nor afford discretion as may be indicated necessary by the threatening activity.

SUMMARY OF THE INVENTION

The invention relates to commercial passenger aircraft of the type having a fuselage with a comparatively long passenger cabin and a forward crew cabin or cockpit separated from the passenger cabin by a solid and relatively sturdy bulkhead wall, with a security alarm system for the discrete notification of the cockpit crew of a threatened or pending disturbance in the passenger cabin.

The security alarm system includes a transmitter assembly including one or more individual portable battery operated transmitter units located in the passenger cabin of the fuselage. The transmitter unit is intended to be carried on the person of authorized personnel such as a cabin attendant or sky marshal. The transmitter unit, for example, can be placed in a pocket, fastened to a lanyard to be worn about the neck of a cabin attendant, or mounted on a belt clip. The transmitter unit can transmit an encoded, low power radio frequency signal, for example, in the 900 MHz spread spectrum frequency band. The transmitter unit has an actuator such as a button switch or other triggering mechanism. Responsive to actuation of the triggering mechanism the transmitter unit instantaneously sends one or more radio frequency data burst signals.

The alarm system also includes an alarm assembly that includes a receiver unit and an alarm unit. In one embodiment the receiver unit is located in the passenger cabin and the alarm unit is located in the cockpit. The receiver unit and the alarm unit are separated by the bulkhead wall between the two cabins and are hard-wired together. Wiring between them can pass through existent conduit in the aircraft fuselage or through specially installed conduit.

The receiver unit is mounted at an intermediate location in the passenger cabin according to space availability but desirably about half way between the fore and aft ends of the passenger cabin. The receiver unit includes a receiver that receives the transmitter signal and converts it into an electrical signal. The alarm unit receives the electrical signal from the receiver. The alarm unit includes one or more alarm devices. The alarm device is connected to the alarm circuit and can include visual or audio alarm mechanisms or a combination thereof. The alarm unit can have an auxiliary output for connection to communication devices that could, for example, communicate with a ground control station. The alarm devices can include one or more blinking lamps, a beeper producing intermittent or steady tones, or a device emitting a prerecorded voice message.

The alarm circuit includes a reset and can include a timer circuit. The reset enables a cockpit crewmember to shut off the alarm signal. The timer circuit option can activate a communication device after a pre-selected period of time, which can send an alarm signal to a remote location such as a ground station.

In another embodiment the alarm assembly includes the receiver unit and alarm unit together in a cabinet located in the cockpit with suitable shielding as may be necessary to avoid interference with avionics equipment. The alarm assembly is mounted on the Dzus-type rail system in the cockpit and can, for example, be mounted in the overhead panel assembly of the cockpit. The receiver unit includes a processor so as to be responsive to the mute function condition imposed in a commercial aircraft cockpit during critical procedures including primarily take-off and landing. Upon receipt of an alarm signal from a transmitter, the processor queries the aircraft control system for a determination of whether a mute condition is in effect. If not, the signal is passed to the alarm unit. If a mute condition is detected, the alarm signal is stored until the mute condition is lifted at which time the alarm signal is conveyed to the alarm unit resulting in activation of the alarm devices.

DESCRIPTION OF PREFERRED EMBODIMENTS

Figure 1:
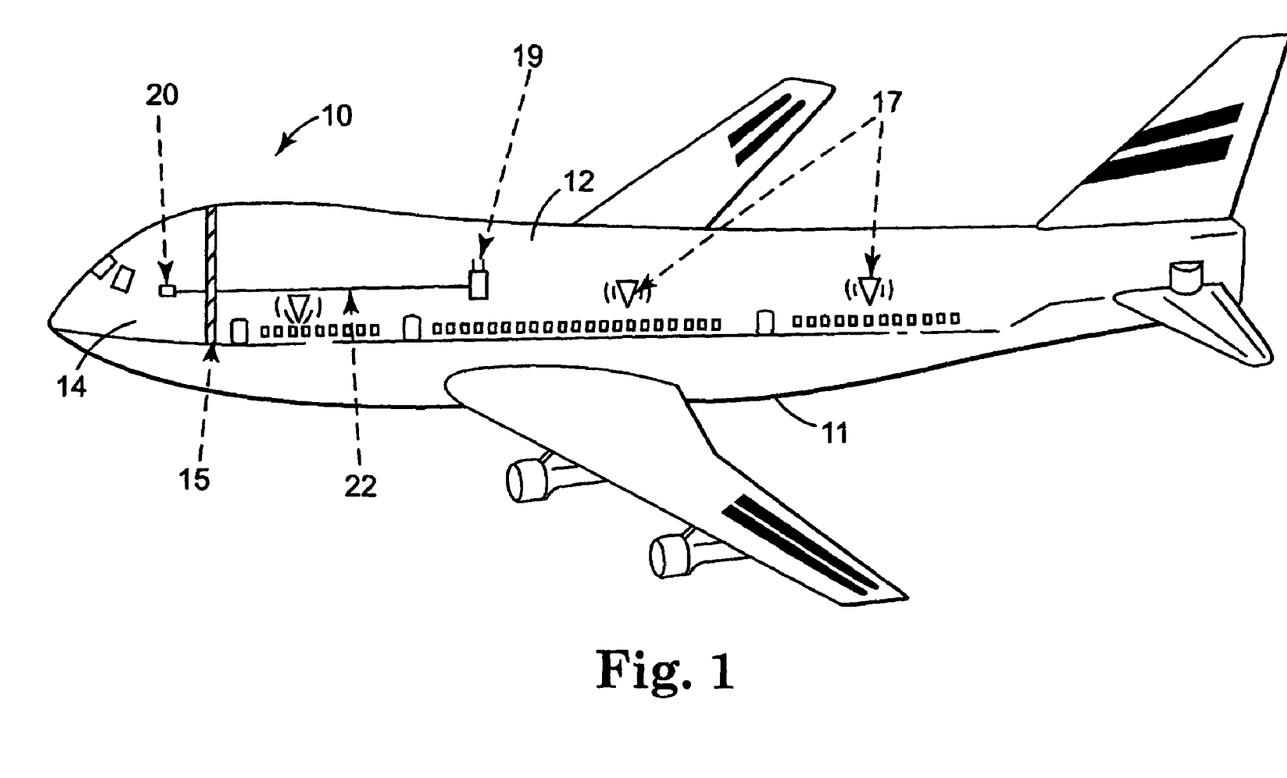
FIG. 1 is a view of a commercial passenger aircraft and alarm security system according to an embodiment of the present invention.

Referring to the drawings, there is shown in FIG. 1 a commercial passenger aircraft indicated generally at 10 having a security alarm system according to an embodiment of the invention which includes the aircraft fuselage 11 having an elongate passenger cabin or compartment 12 and a forward crew cabin or cockpit 14. The cockpit 14 and the passenger cabin 12 are separated by the usual bulkhead wall 15 having a cockpit door (not shown).

The security alarm system of the invention also includes a transmitter assembly, which is comprised of one or more small, portable transmitter units 17 that can be moved freely about the passenger cabin 12. Transmitter units 17 are battery operated and it is intended that authorized individuals in the passenger cabin such as cabin attendants, sky marshals or other security personnel, carry them.

The security alarm system includes an alarm assembly. The alarm assembly includes a receiver unit 19 and an alarm unit 20. The transmitter units 17 transmit to the receiver unit 19. The receiver unit 19 is located at an intermediate location in the passenger cabin so as to minimize the transmitting power necessary to transmit from the transmitters to the receiving unit and avoid interference with radio signals that might be present in the cockpit.

The alarm unit 20 is located in the cockpit. The alarm unit is hard wired to the receiver unit 19 by wiring 22. Wiring 22 can pass through existing conduit on the aircraft disposed between the passenger cabin and the cockpit. The alarm unit is positioned to attract the attention of one or more cockpit crewmembers when energized.

Figure 2:
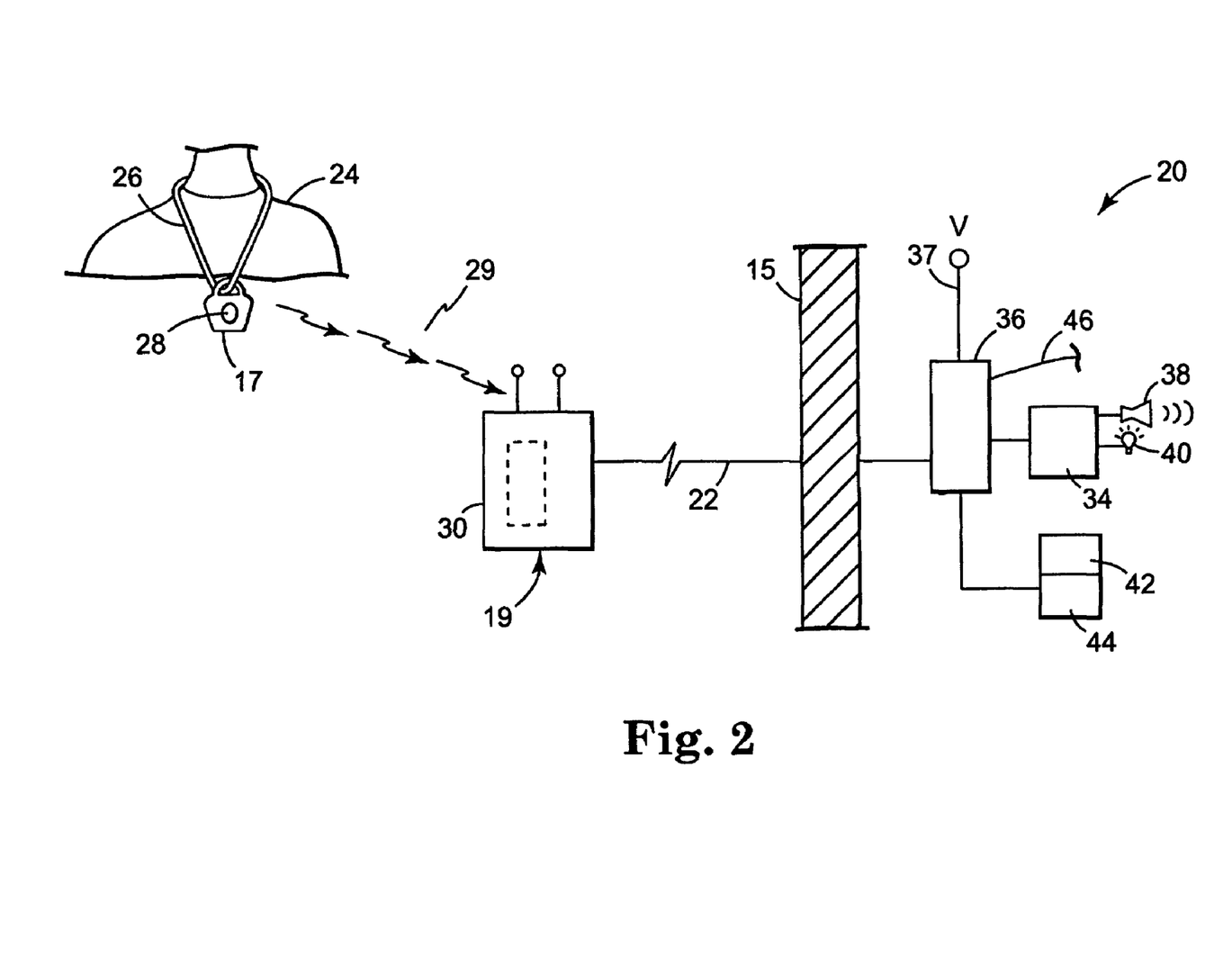
FIG. 2 is a schematic of components of the alarm system of the aircraft of FIG. 1.

Referring to FIG. 2, the transmitter unit 17 can take the form of a pendant of the type that can be suspended from a lanyard 26 worn by a cabin attendant 24. Transmitter 17 is activated by a button switch 28 to send an over the air signal (indicated at 29) to the receiver unit 19. Receiver unit 19 contains a receiving circuit 30, which converts the received radio signal into an electrical signal that is carried through hard wiring 22 past the bulkhead wall 15 to the alarm unit 20.

Alarm unit 20 can include a control module 36 that operates an alarm signal device 34. For example, control module 36 can include a relay or an electronic equivalent that is activated by the electrical signal from the receiver unit 19 to activate alarm device 34. Alarm unit 20 derives electrical power to operate the alarm assembly from a suitable electric power source 37 in the cockpit 14.

Alarm device 34 includes visual or audio alarm mechanisms or a combination thereof. For example, in the embodiment shown the alarm device 34 includes an audio alarm 38 which can emit an intermittent or steady state tone, and a lamp display 40, which includes one or more, blinking lights. Alarm device 34 could optionally incorporate one or more alarm devices already existing in the cockpit.

Alarm unit 20 also includes a reset circuit 42 and a timer circuit 44. Reset 42 is configured so that the alarm indication provided by the alarm device 34 can be turned off by a cockpit crewmember. The alarm unit 20 can optionally have an auxiliary output 46 for other functions such as activating an open microphone system, contacting ground control, activating a video camera, or the like, which can be either instantaneous or time delayed.

In the operation of the security alarm system of the invention, authorized cabin personnel carry one or more transmitter units 17. When there is perceived a threat in the passenger cabin that requires immediate notification of the cockpit crew, the individual activates the transmitter unit to send a signal to the receiver unit 19. This energizes the alarm device 34 to alert the cockpit crew to a potential emergency situation. The cockpit crew can then react according to established airline procedure. The cockpit crew must push the reset button to stop the alarm signal.

Referring to FIGS. 3 through 8 there is shown another embodiment of an aircraft with a security alarm system according to the invention. This embodiment includes an aircraft 50 having a fuselage 52 having interior spaces including a cockpit 52 and a passenger cabin 56 divided by a bulkhead 58. The cockpit 54 has various control panel structures to hold avionics equipment such as instrumentation, switches, dials, alert lights and the like as they are commonly found in commercial aircraft cockpits. The aircraft has the usual aircraft electric power system to operate the various controls as necessary. In particular, an overhead panel 60 is shown schematically in FIG. 3 and in FIG. 4. Overhead panel 60 is located in the cockpit 54 and holds a variety of avionics such as that described. Commercial aircraft commonly use a standard system of mounting structure for avionics and like instrumentation employing a rail mounting system indicated schematically at 59 in FIG. 3. An example of such a system is a Dzus rail mount system. Such a mounting system enables the standard mounting of various instrumentation components and the interchangeability thereof. It also enables quick fastening rail/rack mounting of instrumentations in the aircraft access panels.

Figure 3:
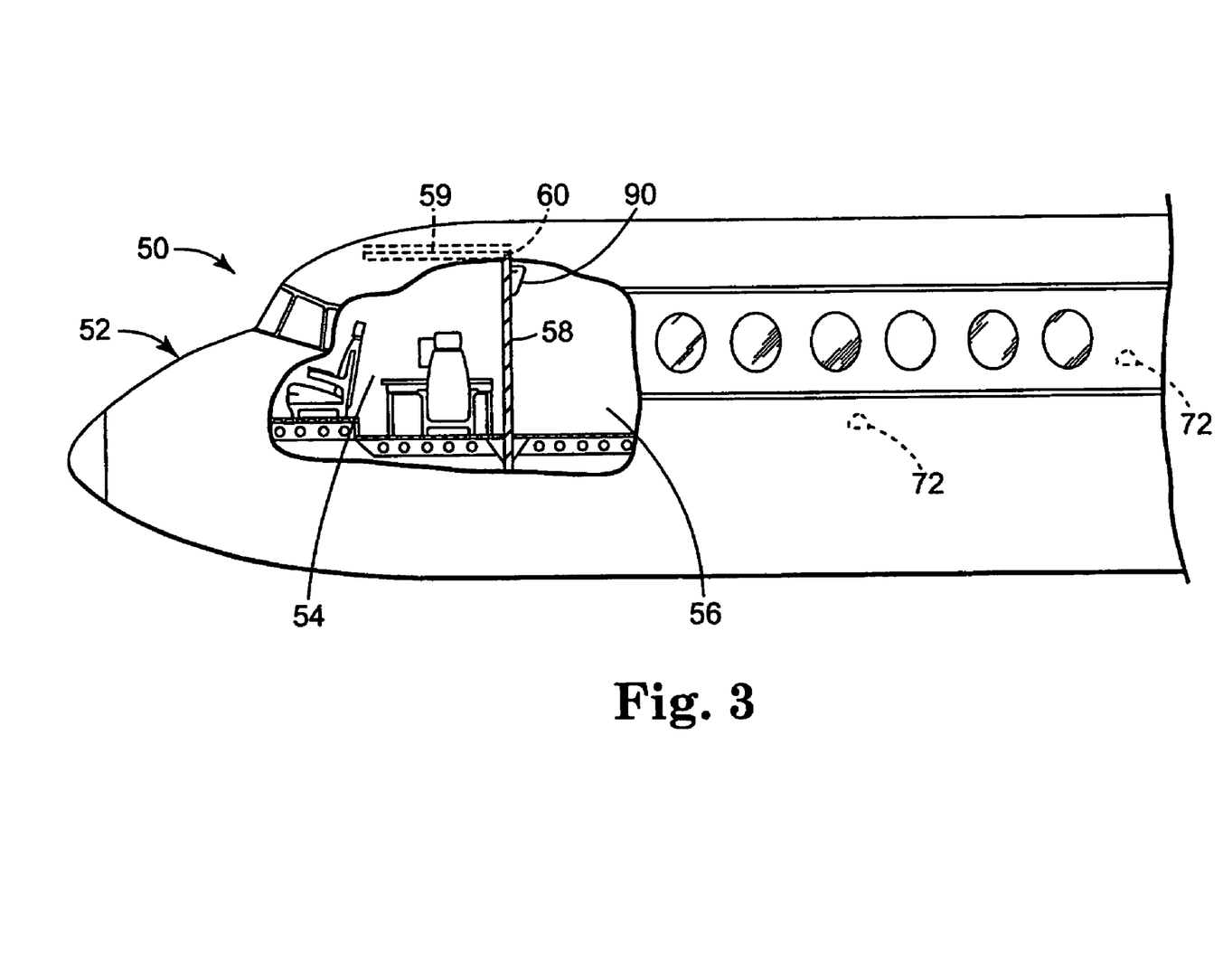
FIG. 3 is a partial view of a commercial passenger aircraft with a security alarm system according to another embodiment of the invention.
Figure 4:
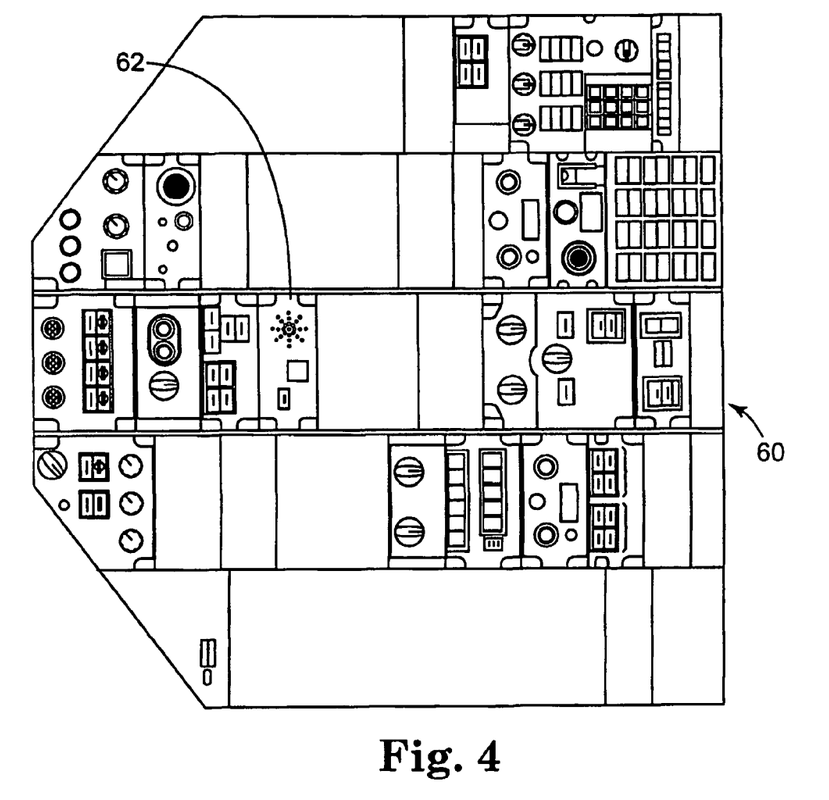
FIG. 4 is an enlarged partially schematic view of the overhead panel in the cockpit of the aircraft of FIG. 3 taken generally about the line 4—4 thereof.
Figure 5:
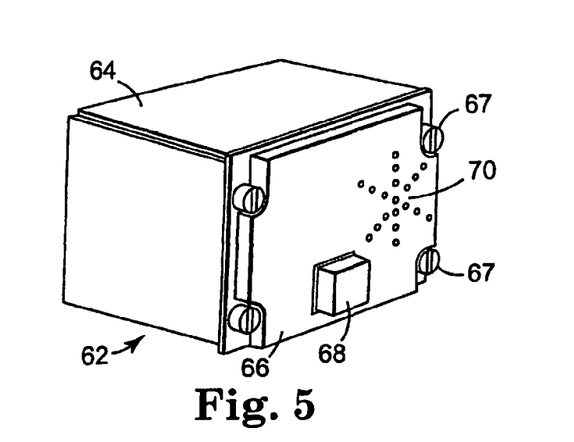
FIG. 5 is a perspective view of the alarm assembly of the alarm system of the aircraft of FIG. 3.

An alarm assembly 62 is shown mounted in the overhead panel 60. Alarm assembly 62, shown more specifically in FIG. 5, fits in a standard bay such as that located in the aircraft overhead panel or in other such panels located in the cockpit. As shown in FIG. 5, the alarm assembly 62 includes a Dzus rail mount or equivalent system compatible enclosure or box 64 having a front panel 66 and four corner mounted partial turn stud-fasteners 67 to enable quick and dependable rack/rail mounting within the standard aircraft panel mounting bay. Alarm assembly 62 also includes a front mounted combination alarm display light/reset button 68 and an array of spaced apart openings 70 to permit audible alarm alert from an audio alarm device.

One or more prompts or transmitter units 72 are spaced about the cabin 56 and usually will be carried upon the persons of cabin attendants or security or personnel such as a sky marshal. The transmitter units 72 communicate via radio frequency to the alarm unit 62.

Figure 6:
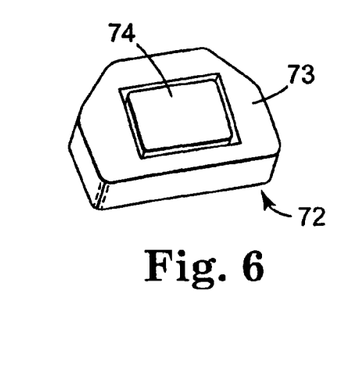
FIG. 6 is a perspective view of a transmitter unit of the security alarm system of the aircraft of FIG. 3.

A transmitter unit 72 is more particularly shown in FIG. 6. The transmitter 72 includes a housing 73 and an activation button 74 that can be slightly recessed relative to the corresponding face of the housing 73 in order to prevent accidental engagement. The housing 73 can have a modified trapezoidal shape as shown in order that it will not be confused with other devices as may be carried on the person of the flight attendant, such as a pager or the like.

Figure 7:
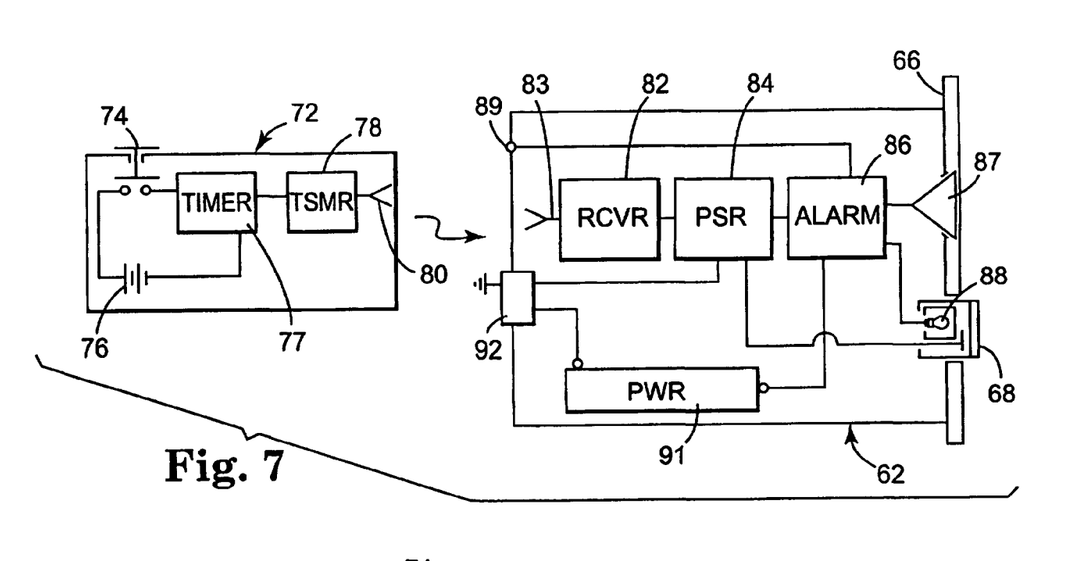
FIG. 7 is a block diagram of a transmitter unit and of the alarm assembly of the security alarm system of the aircraft of FIG. 3.

FIG. 7 shows a block diagram of the transmitter unit 72 and the alarm assembly 62. The transmitter unit 72 includes a circuit having the activation switch 74. A battery 76 supplies power to the circuit. The circuit includes an adjustable timer 77, which is connected to a transmitter 78. The transmitter 78 is connected to an antenna 80 so as to send a signal to the alarm assembly 62. The timer 72 is adjustable in order to adjust the time period that the button 74 needs to be depressed before the transmitter 78 will transmit a signal. Normally it will be desirable to require that button 74 be depressed for a preselected period of time before a signal will be transmitted from the transmitter 72. The purpose of this is to prevent false alarms. Transmitter 78 sends out one or more low power data bursts over the 900 MHz spread spectrum frequency. Other frequency bands could be used and are considered equivalent. The data burst signal is encoded to the alarm assembly. This is to insure that only transmitters encoded to a particular aircraft or aircraft fleet can be used with the alarm assembly of the aircraft.

As shown in FIG. 7, the receiver unit includes a receiver 82 adapted to receive coded signals from the transmitter unit 72 through an antenna 83. The receiver 82 is connected to a microprocessor board 84. An alarm module 86 is connected to the receiver 82 through the processor board 84. The alarm module 86 can include an audible alarm device indicated as a speaker 87; a visual alarm device such as a lamp 88; and one or more auxiliary outputs 89 to accomplish such other functions as opening a microphone, contacting a remote control tower, energizing a video camera or the like. (A video camera 90 is shown in the passenger cabin 56 in FIG. 3.) The alarm circuit derives power through a power regulator that derives power through a multiple pin connector plug 92 connecting to aircraft power. FIG. 7 also shows that the reset button 68 is combined with the visual alarm device 88 for purposes of convenience. These devices could as well be separated.

During critical periods of aircraft operation, and in particular during take-off and landing procedures, it is important that there be no distractions to the cockpit crew. For this purpose, commercial airliner cockpits are equipped with a mute function. The mute function automatically mutes various alarms in the cockpit so as not to distract the cockpit crew. Various events will automatically engage and disengage the mute function according to the aircraft manufacturer and the airline operating the aircraft. For example, the mute function may be engaged automatically when flaps are lowered, indicative of the commencement of a landing procedure. Upon touchdown, or a condition known as "weight-on-wheels" (WOW) the mute function is automatically disengaged. The aircraft according to the invention having the alarm system described herein recognizes the mute function and acknowledges it.

Figure 8:
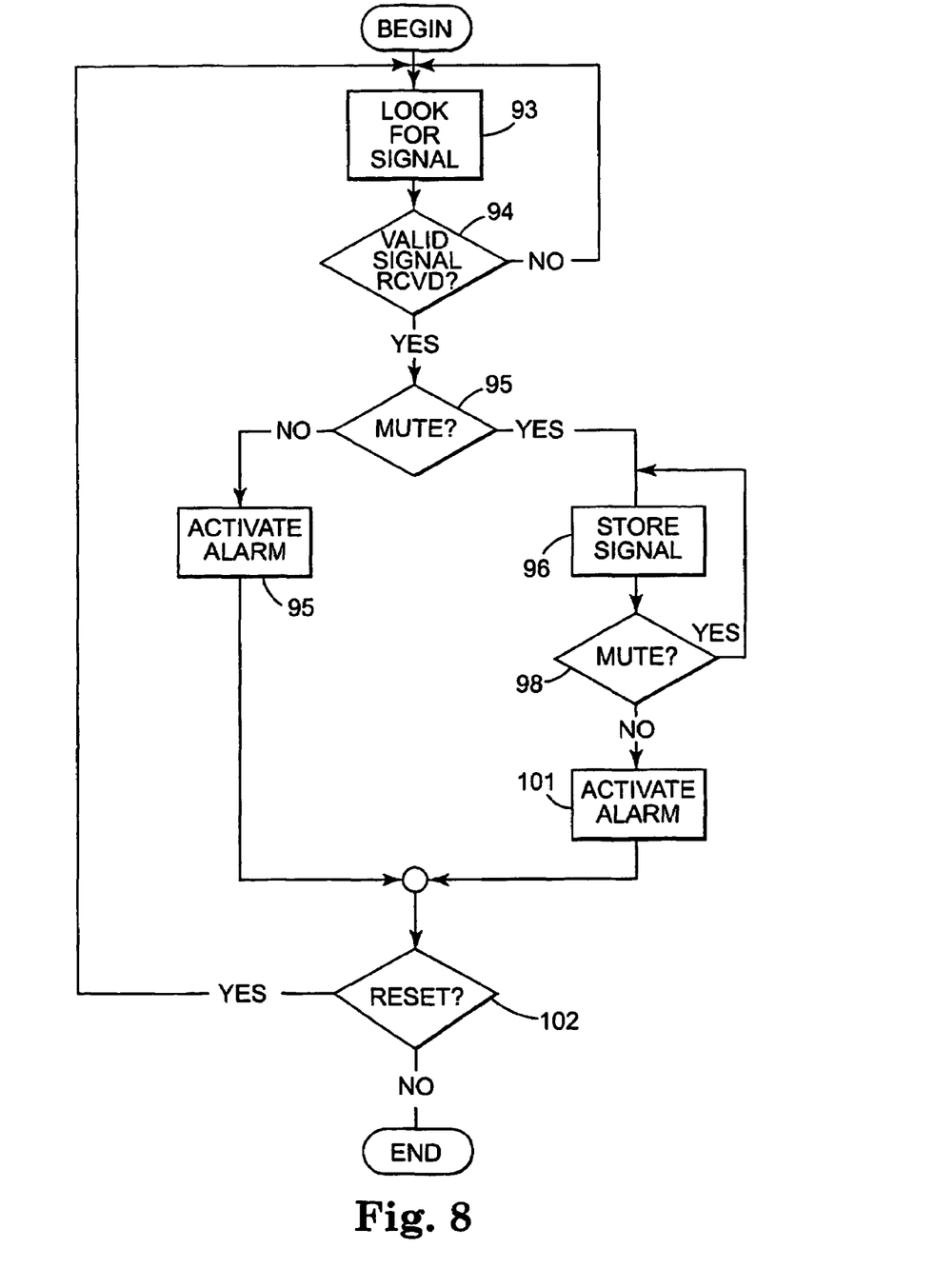
FIG. 8 is a flow chart showing the alarm signal storage function of the alarm assembly responsive to detection of a mute condition in the cockpit of the aircraft.

The alarm assembly 62 detects the mute-on condition of the aircraft through one or more of the pins of the plug 92. When the receiver unit senses a mute-on condition, any signals received from a transmitter unit will be stored until the receiver unit detects that the mute-on condition has terminated. This is shown diagrammatically in the flow chart of FIG. 8. FIG. 8 depicts only one example of a flow chart accomplishing such functions. Those skilled in the art will recognize that many variations of such a flow chart could be devised. According to the flow chart of FIG. 8, the receiver at box 93 is alert for a signal from a transmitter unit 72. At the decision box 94 the processor queries whether or not a valid (properly encoded) signal has been received. If a valid signal is not detected, the alert status continues. If a valid signal is detected, the processor next queries at decision box 95 whether or not the mute function is on. If it is determined that the mute function is not activated (the "no" leg), the alarm module is activated to activate the various alarm devices that may be connected. If the mute inquiry determines that the mute function is on (the "yes" leg), then the processor stores the signal received from the transmitter (box 96). Following storage of the signal, the processor then again instigates an inquiry as to whether or not the mute function is on (at decision box 98). If so, it continues to store the signal. If not, the alarm module is activated (box 101).

Following activation of the alarm module, under normal circumstances the reset button will be engaged (decision box 102) which will return the program to the beginning alert status.

In the use of the invention, one or more transmitter units 72 are carried upon the persons of the cabin attendants or security personnel located in the passenger cabin 56 of the aircraft 50. The transmitter units typically will be carried in a pocket of the person. The transmitter is carried at a location where the person can discretely engage it. When the cabin attendant or other person senses an emergency situation involving a threatening individual in the cabin, the person can discretely activate the alarm by depressing the button 74 for the predetermined amount of time in order to activate the transmitter 78 to send an encoded signal to the receiver unit 62 located in the cockpit. The alarm assembly, determining that the signal is a properly encoded one, which it can accept, then queries the cockpit avionics as to whether or not a mute condition exists. If not, the alarm module is activated to activate the alarm devices. If so, the signal is stored until such time as it is sensed that the mute condition is no longer in effect. Once the alarm has been generated, it is silenced by use of the reset button 68.

The embodiment of the invention in which an exclusive property or privilege is claimed are defined as follows:

1. A passenger aircraft with a security alarm system, comprising:
   a passenger aircraft fuselage;
   an aircraft electric power system installed in the fuselage;
   a bulkhead installed in the fuselage dividing the fuselage into a passenger cabin and a cockpit;
   at least one portable battery operated transmitter unit located in the passenger cabin and intended to be carried on the person of authorized personnel;
   each transmitter unit including a transmitter that can generate a signal in the form of a coded radio frequency pulse of short duration;
   each transmitter unit having a switch connected to the transmitter to activate the transmitter to generate said signal;
   an alarm assembly including a receiver unit and an alarm unit, said alarm assembly connected to the aircraft electric power system;
   said receiver unit installed in the passenger cabin and said alarm unit installed in the cockpit and connected by wire to the receiver unit;
   said receiver unit including a receiver for receipt of a coded signal from a transmitter for activation of the alarm unit;
   said alarm unit including one or more alarm devices activated by a pulse signal from the receiver unit received from a transmitter in the passenger cabin.

2. The aircraft of claim 1 including:
   a reset connected to the alarm unit to reset the alarm unit.

3. The aircraft of claim 2 wherein:
   said alarm unit includes a visual alarm device.

4. The aircraft of claim 3 wherein:
   said visual alarm device is a lamp.

5. The aircraft of claim 3 wherein:
   said alarm unit includes an audio alarm device.

6. The aircraft of claim 5 including:
   an auxiliary output from the alarm system connectible to other aircraft systems.

7. The aircraft of claim 2 wherein:
   said alarm system includes an audio alarm device.

8. The aircraft of claim 7 wherein:
said audio alarm device is an intermittent tone generating device.

9. The aircraft of claim 8 wherein:
said alarm system includes a visual alarm device.

10. The aircraft of claim 2 wherein:
said transmitter transmits a data burst on the 900 MHz spread spectrum frequency band.

11. A passenger aircraft with a security alarm system comprising:
a passenger aircraft fuselage;
an aircraft electric power system installed in the fuselage;
a bulkhead installed in the fuselage dividing it into a passenger cabin and a cockpit, said cockpit having at least one control panel with a rail mount system for mounting aircraft avionics equipment;
at least one portable battery operated transmitter unit located in the passenger cabin and intended to be carried on the person of an authorized personnel;
each transmitter unit including a transmitter that can generate a coded signal in the form of a radio frequency data burst;
each transmitter unit having a switch connected to the transmitter to activate said transmitter to generate said signal;
an alarm assembly installed in the cockpit connected to said aircraft electrical system for power, said alarm system having a cabinet with fasteners compatible with the rail mounting system whereby the cabinet is mounted in the control panel;
said alarm assembly including a receiver unit and an alarm unit connected to the receiver unit;
said receiver unit including a receiver for receipt of a coded signal from a transmitter for activation of the alarm unit;
said alarm unit including one or more alarm devices activated upon receipt of a signal by the receiver unit received from a transmitter in the passenger cabin.

12. The aircraft of claim 11 wherein:
said transmitter can generate a coded signal in the form of one or more radio frequency data bursts in the 900 MHz spread spectrum frequency band.

13. The aircraft of claim 12 including:
a reset circuit connected to the alarm unit to reset the alarm unit.

14. The aircraft of claim 13 wherein:
said transmitter unit switch is a push button switch that is depressed in order to activate the transmitter.

15. The aircraft of claim 14 including:
a timer in the transmitter unit connected between the switch and the transmitter, said timer configured to require that the button switch be depressed a predetermined period of time before the transmitter will transmit a signal in order to prevent transmission of a signal upon accidental engagement of the switch.

16. The aircraft of claim 15 wherein:
said alarm unit includes a visual alarm device.

17. The aircraft of claim 16 wherein:
said alarm unit includes an audio alarm device.

18. The aircraft of claim 13 including:
one or more auxiliary outputs from the alarm system connectible to other aircraft systems.

19. The aircraft of claim 18 including:
a video camera connected to an auxiliary output.

20. The aircraft of claim 17 wherein:
said reset circuit includes a reset button integral with said lamp.

21. A passenger aircraft with a security alarm system comprising:
a passenger aircraft fuselage;
an aircraft electric power system installed in the fuselage;
a bulkhead installed in the fuselage dividing it into a passenger cabin and a cockpit;
at least one portable battery operated transmitter unit located in the passenger cabin and intended to be carried on the person of an authorized personnel;
each transmitter unit including a transmitter that can generate a coded signal in the form of a radio frequency data burst;
each transmitter unit having a switch connected to the transmitter to activate said transmitter to generate said signal;
an alarm assembly installed in the cockpit connected to said aircraft electrical system for power;
said alarm assembly including a receiver unit and an alarm unit connected to the receiver unit;
said receiver unit including a receiver for receipt of a coded signal from a transmitter for activation of the alarm unit;
said alarm unit including one or more alarm devices activated upon receipt of a signal by the receiver unit received from a transmitter in the passenger cabin;
a reset circuit connected to the alarm unit to reset the alarm unit;
a mute control installed in said cockpit in order to mute selected aircraft operational functions during critical aircraft operational procedures, said mute control generating a mute signal to signify a mute-on condition and a mute-off condition;
said alarm assembly connected to the mute control for recognizing said mute signal and, when the mute signal is in the mute-on condition, storing signals received from a transmitter unit while the mute-on condition is in effect, and transmitting the stored signal to the alarm unit when the mute-on condition is ended.

22. The aircraft of claim 21 wherein:
said transmitter can generate a coded signal in the form of one or more radio frequency data bursts in the 900 MHz spread spectrum frequency band.

23. The aircraft of claim 22 wherein:
said means for recognizing said mute signal includes a microprocessor.

24. The aircraft of claim 23 including:
a timer in the transmitter unit connected between the switch and the transmitter, said timer configured to require that the button switch be depressed a predetermined period of time before the transmitter will transmit a signal in order to prevent transmission of a signal upon accidental engagement of the switch.

25. The aircraft of claim 23 wherein:
said alarm unit includes a visual alarm device.

26. The aircraft of claim 24 wherein:
said visual alarm device is a lamp.

27. The aircraft of claim 24 wherein:
said alarm unit includes an audio alarm device.

28. The aircraft of claim 27 including:
one or more auxiliary outputs from the alarm system connectible to other aircraft systems.

29. The aircraft of claim 28 including:
a video camera connected to an auxiliary output.

30. The aircraft of claim 26 wherein:
said reset circuit includes a reset button integral with said lamp.

* * * * *